Dec. 23, 1930.  J. B. McWILLIAMS  1,786,020
CONVEYING APPARATUS
Filed Dec. 5, 1928  3 Sheets-Sheet 1
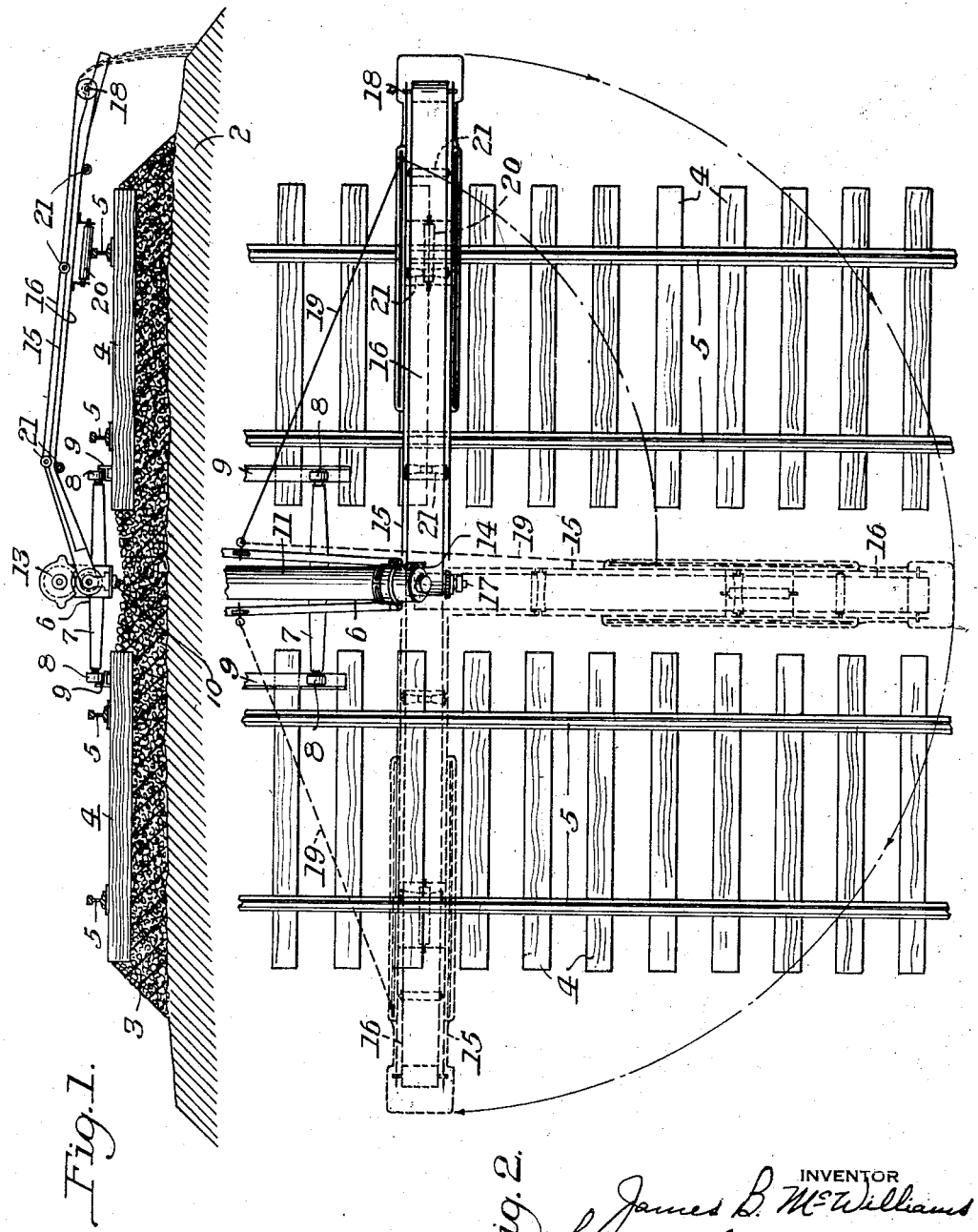

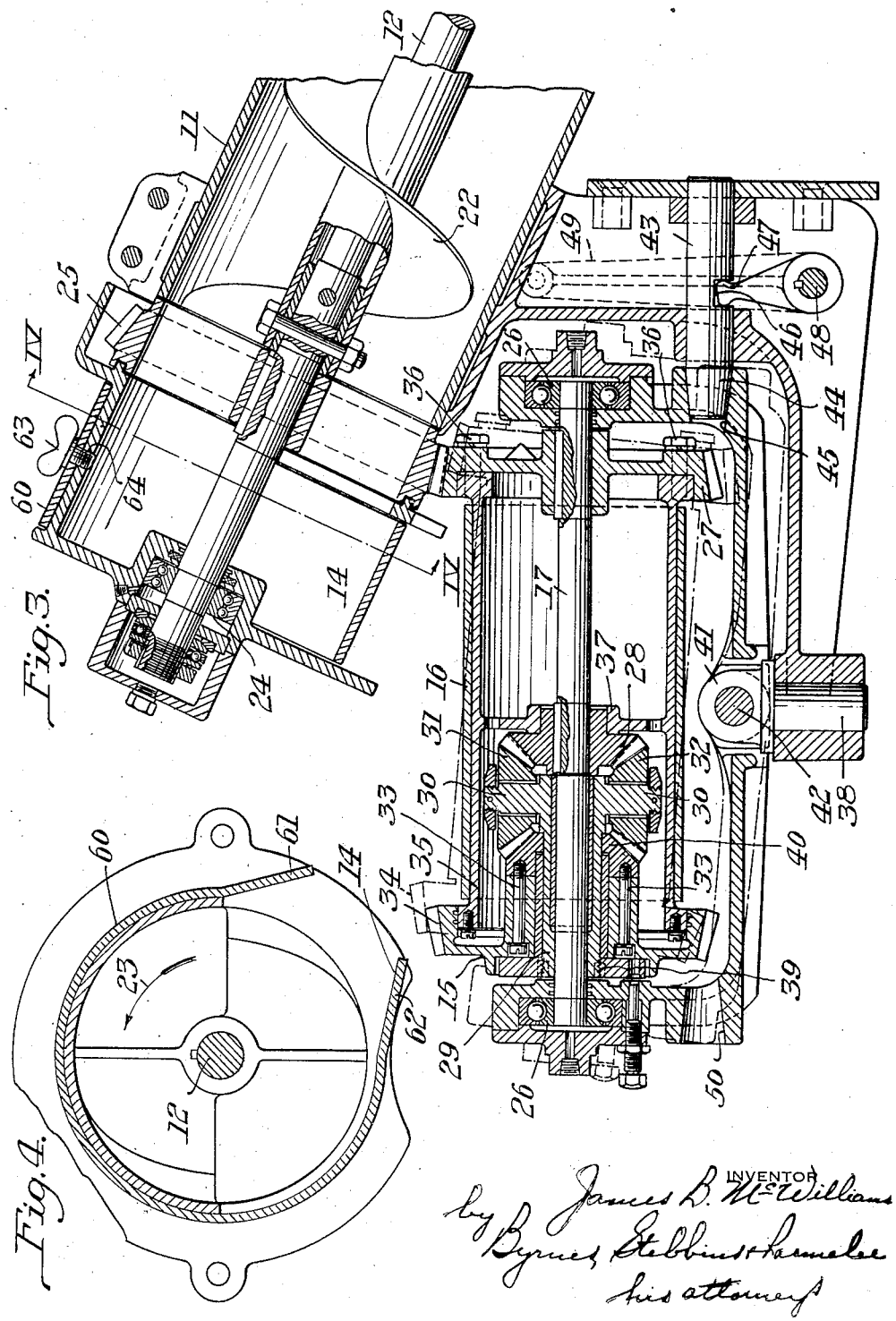

Dec. 23, 1930.    J. B. McWILLIAMS    1,786,020
CONVEYING APPARATUS
Filed Dec. 3, 1928    3 Sheets-Sheet 3
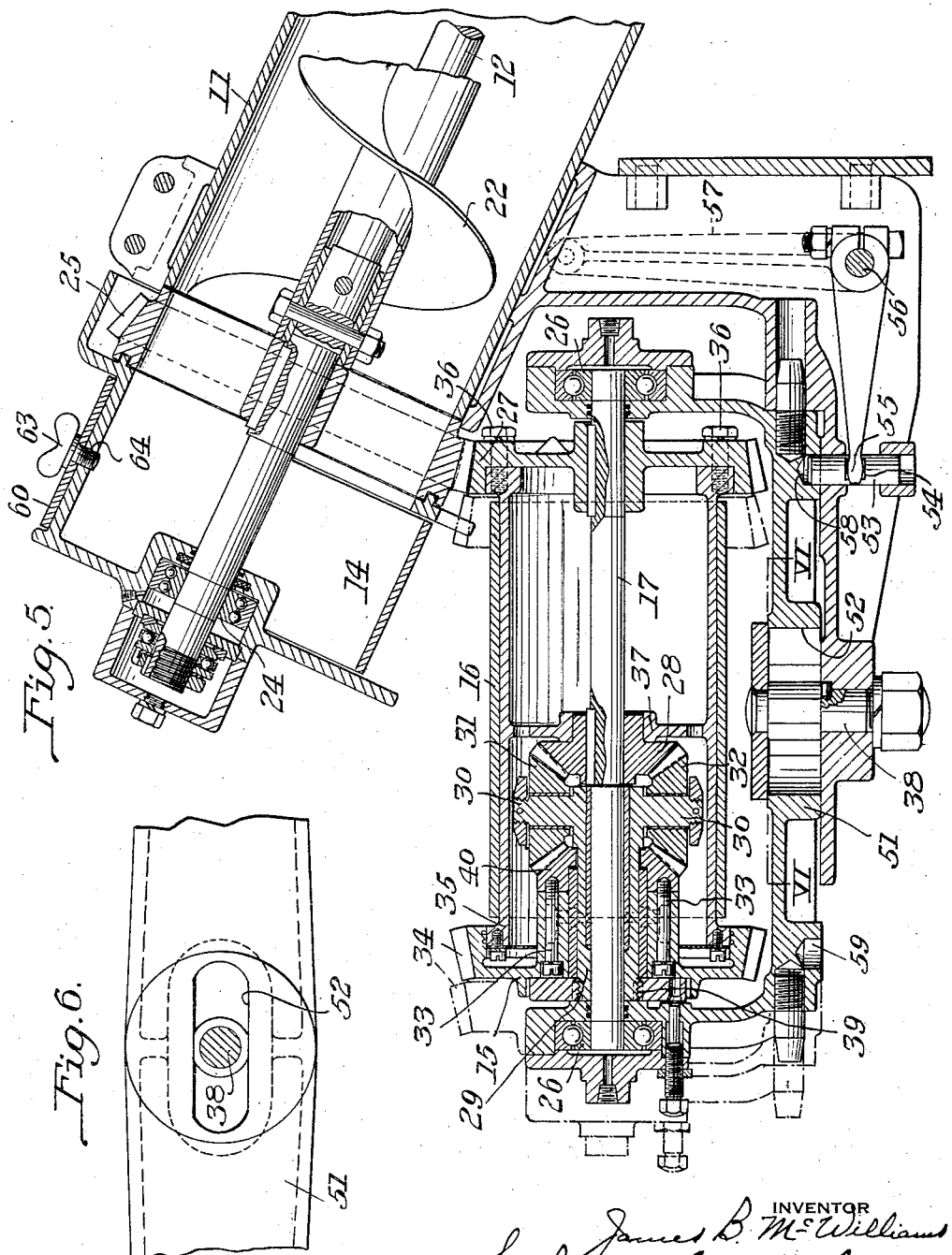

Patented Dec. 23, 1930

1,786,020

UNITED STATES PATENT OFFICE

JAMES B. McWILLIAMS, OF PITTSBURGH, PENNSYLVANIA, ASSIGNOR TO RAILWAY MAINTENANCE CORPORATION, OF ASPINWALL, PENNSYLVANIA, A CORPORATION OF PENNSYLVANIA

CONVEYING APPARATUS

Application filed December 3, 1928. Serial No. 323,287.

This invention relates to conveying apparatus and more particularly to conveying apparatus adapted to convey material in various directions from a receiving station. It relates still more particularly to conveying apparatus adapted to be disposed selectively in different directions from a receiving station and to at all times operate to convey material away from the receiving station regardless of the direction in which the conveying apparatus is disposed. It relates further to reversible conveying apparatus adapted selectively to convey material in opposite directions from a receiving station, the direction of motion of the conveying mechanism being away from the receiving station in whichever direction the apparatus may extend with respect thereto.

Conveying mechanism has heretofore been known which comprises a conveying element such as an endless belt stretched between a pair of supporting shafts and adapted to extend in desired adjusted directions from a given point such as a receiving station, the conveying element being at all times driven in a direction away from the receiving station. The driving mechanism in conveying apparatus of this type usually comprises a gear connected with the belt for driving it and disposed generally parallel to the plane in which the conveying apparatus is adapted to be moved to assume its various positions, there being a driving gear meshing therewith and adapted for driving the belt in a desired direction at all times. Such mechanism is relatively simple because the gear connected with the conveying element may move about the center of the driving gear as an axis, while at all times remaining in mesh therewith.

It is not always convenient or advisable to drive a swingable conveyor of the type above mentoned by means of such a gear mechanism because the source of power may not be such that motion can be efficiently transmitted to the conveying element thereby. This is the case, for example, when a plurality of conveyors is adapted for conveying material successively from one to another, all being driven from a common source of power. For instance, when one conveyor is directly connected to a source of power and is adapted to deliver material, and also transmit driving power, to a second conveyor, unless the respective conveyors are of such construction as will conveniently permit of a pair of gears in mesh lying in a plane substantially parallel to that of movement of one of them, some other driving means must be utilized.

One of the objects of the present invention is the solution of this problem and the provision of driving mechanism effective to transmit power from one conveyor to a second conveyor while at the same time material is delivered by one of the conveyors to the other.

As an example of a construction to which the present invention is well adapted, there will be considered a conveying system utilizing a screw conveyor adapted to be driven at all times in the same direction and to transmit power and deliver material to a conveyor of the endless type adapted to be disposed selectively in various directions from the point of delivery of the material from the screw conveyor thereto, the direction of motion of the endless conveyor being at all times away from such point of delivery.

I provide conveying apparatus comprising means for conveying material selectively in a plurality of directions from a receiving station, means permitting alteration of the direction thereof, driving means operable in the same direction regardless of the direction of the conveying means, and means connected with the conveying means and having respective portions selectively adapted for cooperation with the driving means when the conveying means is in different directions whereby the conveying means is always actuated to convey material away from the receiving station. Other objects and advantages of the invention will become apparent as the following description of certain present preferred embodiments thereof proceeds.

In the accompanying drawings I have shown certain present preferred embodiments of the invention, wherein Figure 1 is an elevational view of a conveying apparatus, Figure 2 is a plan view of the conveying apparatus shown in Figure 1, Figure 3 is a cross sectional view, partly in section and partly broken away, through a conveyor driving mechanism, Figure 4 is a cross section taken on the line IV—IV of Figure 3, Figure 5 is a view similar to Figure 3 of a modified construction, and Figure 6 is a cross section taken on the line VI—VI of Figure 5.

Referring more particularly to the drawings and to Figures 1 and 2 thereof, reference numeral 2 designates generally a railroad sub-grade upon which is disposed a suitable road bed 3 of ballast or like material, serving as a foundation for cross ties 4 having rails 5 connected thereto in the usual manner. Reference numeral 6 designates generally a road bed cleaning apparatus mounted for movement longitudinally of the road bed and adapted to clean the ballast and to convey away the matter cleaned therefrom.

The cleaning apparatus is mounted on suitable axles 7, at the ends of which are journalled supporting wheels 8. Removable and adjustable rails 9 are provided for cooperation with the wheels 8 to support the cleaning apparatus. Sections of rail 9 may be progressively placed along the road bed as the cleaning apparatus moves forward.

The cleaning apparatus comprises a suction or intake member 10 adapted to pick up the matter to be cleaned from the road bed. Such matter may either first have been concentrated between the respective tracks beneath the intake member 10, or such member may have connections thereon adapted to receive the matter to be cleaned from the road bed at various points on the surface thereof. Material taken up by the intake member 10 is fed to a screw conveyor 11 extending upwardly at an angle from the road bed. The screw conveyor comprises a shaft 12 (Figures 3, 4 and 5) adapted to be driven by any suitable source of power, as for instance a motor 13 (Figure 1). The motor 13 need not be reversible because the direction of rotation of the screw conveyor is always the same in order to raise the cleaned material to a point substantially above the road bed.

At its upper extremity the screw conveyor 11 is provided with an outlet 14 through which material is delivered to a conveyor 15 of the endless type. The conveyor 15 comprises a conveying element 16 extending between parallel shafts 17 and 18 driven by the shaft 17 through suitable connections, as will be presently described. This conveyor is in part supported from the framework of the cleaning apparatus by flexible members 19 which permit it to swing about a vertical pivot substantially beneath the material outlet 14 of the screw conveyor 11. The endless conveyor is thus adapted to assume positions extending laterally in both directions with respect to the road bed for conveying material over the tracks and to discharging stations at the sides of the right of way. The conveyor 15 is also adapted to assume an inoperative position generally parallel to the tracks, as shown in Figure 2, in order to permit the passage of trains on the respective tracks without interfering therewith.

The frame of the conveyor 15 is provided on its lower surface with anti-friction means 20 adapted to rest upon the rails 5 and to move therealong upon motion of the cleaning apparatus, so that the action of the apparatus may be substantially continuous and uninterrupted. Suitable pulleys 21 are provided in the conveyor frame for supporting the conveying element 16.

Mounted upon the shaft 12 of the screw conveyor 11 is a spiral conveying element 22 of usual construction. As above stated, means need be provided for rotating the spiral conveying element in one direction only for conveying material upwardly from the road bed. This direction is indicated by the arrow 23 in Figure 4. The upper extremity of the shaft 12 is suitably journalled to its conveyor frame in any well known manner as shown at 24.

Keyed to the shaft 12 is a bevel gear 25 adapted, as will be presently described, for driving the endless conveyor 15. The shaft 17, through which the conveyor 15 is driven, is journalled in suitable bearings 26 in the conveyor frame. Adjacent the right hand end of the shaft 17 (viewing Figures 3 and 5) there is keyed to it a bevel gear 27 adapted to mesh with the driving gear 25 on the screw conveyor shaft when the respective parts are in the position shown in full lines in Figure 2. Viewing such figure, the screw conveyor shaft and consequently the gear 25 rotate in a counter-clockwise direction, thereby directly imparting to the endless conveyor element 16, through the gear 27, motion which causes its upper reach to move toward the right or away from the material outlet 14.

When, however, the conveyor 15 is moved to the left hand position, viewing Figure 2, means must be provided for driving it so as to convey material away from the screw conveyor outlet. The direction of rotation of the screw conveyor being constant, a gear keyed to the opposite end of the shaft 17 of the conveyor 15 would not serve the desired purpose but would cause rotation of the conveying element 15 toward instead of away from the screw conveyor.

To this end a bevel gear 28 is keyed to the shaft 17 near its central portion. Screw threaded to the frame as at 39 is a sleeve 29 having integral therewith bearings 30 upon which are loosely mounted for rotation oppositely disposed bevel gears 31 and 32, each meshing with bevel gear 28. Surrounding the sleeve 29 is a bevel gear 40 meshing with the bevel gears 31 and 32. Connected to the bevel gear 40 by suitable bolts 33 is a bevel gear 34 having free bearing upon the outer surface of a cylindrical member 35 secured by bolts 36 to the bevel gear 27. The bevel gears 40 and 34 are in effect integral one with the other and rotate together. The member 35 has an inwardly projecting circular boss 37 which serves as a bearing on the bevel gear 28.

The mechanism above described for driving the conveyor 15 is mounted upon a vertical pivot 38, which is the pivot above referred to substantially beneath the outlet 14 of the screw conveyor. The entire conveyor 15 is adapted to be swung about the pivot 38 to extend in opposite directions from the cleaning apparatus. When the conveyor 15 assumes the left hand position, viewing Figure 2, the bevel gear 34 is adapted to mesh with the driving gear 25. Due to the fact that the position of the conveyor 15 has been reversed, the direction of motion imparted to the bevel gear 34 is the opposite of that imparted to the gear 27 when in mesh with the driving gear 25.

The gear 34, when driven by the gear 25, causes rotation of the gear 40, which in turn rotates the gears 31 and 32 and imparts rotation in the opposite direction to the gear 28 and consequently to the shaft 17. Thus the shaft 17 is driven in such a direction that the upper reach of the conveying element 16 moves away from the screw conveyor regardless of which of the gears 27 and 34 is in mesh with the driving gear 25. The conveying element 16 surrounds the member 35 and derives its motion therefrom.

Inasmuch as simply by swinging the conveyor 15 about the pivot 38, considerable difficulty might be encountered in effecting proper engagement and disengagement of the respective gears 27 and 34 with the driving gear 25, I provide means for effecting relative movement of the respective gears 27 and 34 and the driving gear 25 sufficiently to permit engagement and disengagement thereof independently of movement of the conveying means about the pivot 38. One such provision is illustrated in Figure 3.

In Figure 3, the frame carrying the shaft 17 and its associated mechanism is mounted by means of a suitable bearing 41 for rotation in a vertical plane about a stub shaft 42, which in turn is fixedly mounted above the vertical pivot 38. Slidably mounted in the frame of the cleaning apparatus is a pin 43 having a tapered inner extremity 44 adapted to enter a suitable tapered opening 45 in the conveyor frame. The pin 43 is provided with a lateral slot 46 in which is received a cam 47 keyed to a shaft 48. Also keyed to the shaft 48 is an operating lever 49 to which any suitable operating connection may be made.

Actuation of the operating lever 49 toward the right, viewing Figure 3, causes clockwise rotation of the shaft 48 and consequently movement of the cam 47 toward the right, such movement carrying with it the pin 43, by reason of the engagement of the cam 47 in the slot 46, until the tapered extremity 44 of the pin becomes disengaged from the opening 45 in the conveyor frame. Upon such disengagement, the conveyor frame is free to pivot about the stub shaft 42 in a vertical plane to a position substantially such as indicated in dot and dash lines in Figure 3, so as to permit disengagement of the gear 27 and the driving gear 25. When such disengagement has been effected, the conveyor 15 as a whole may be swung about the vertical pivot 38 to a position in which the gear 27 is free from the gear 25.

The conveyor as a whole is then tilted about the shaft 42 so that the gear 34 assumes a lowermost position corresponding to that previously assumed by the gear 27, whereupon the conveyor 15 may be brought into the position opposite that which it previously occupied. It may then be rotated about the shaft 42 until the gear 34 meshes with the driving gear 25 and the pin 43 may thereafter be moved inwardly by its actuating mechanism to enter a tapered opening 50 opposite and corresponding in size, shape and position to the tapered opening 45 in the conveyor frame.

In Figure 5 is shown an alternative construction for permitting sufficient disengagement of the driving gear 25 and the respective gears 27 and 34 so that the conveyor 15 may be swung about its pivot 38 without any danger of stripping the gears. According to such construction the shaft 17 and its associated mechanism are mounted upon a slide 51 provided with a substantially horizontal slot 52 adapted to embrace the pivot 38. The slot 52 extends crosswise of the conveyor 15 so as to permit lateral sliding movement thereof with respect to the pivot 38.

Slidably mounted in the frame of the cleaning apparatus is a pin 53 having a lateral slot 54 in which is received a cam 55 keyed to a shaft 56. Also keyed to the shaft 56 is an operating lever 57 to which any suitable operating connection may be made. Operation of the operating lever 57 toward the left, viewing Figure 5, causes counter-clockwise rotation of the shaft 56 and consequent movement of the cam 55 downwardly, such movement carrying with it the pin 53 by reason of the engagement of the cam 55 in the slot 54, until the pin 53 becomes disengaged from a hole 58 in the conveyor frame. Upon disengagement of the pin 53 from the hole 58 the conveyor 15 may be moved laterally to the left to the position shown in dot and dash lines in Figure 5, wherein the gear 27 is out of engagement with the driving gear 25.

The conveyor 15 may then be swung about the pivot 38 for a sufficient distance to clear the gears 27 and 25, whereupon it may be moved laterally in the direction of the gear 27 and then brought into the position opposite that wherein the gear 27 meshes with the gear 25. When such position has been attained the conveyor 15 may then be moved laterally until the gear 34 meshes with the driving gear 25, whereupon the pin 53 is moved by its actuating mechanism into engagement with an opening 59 opposite and corresponding in size, shape and position to the opening 58.

A circular slide 60 surrounds the upper extremity of the screw conveyor 11 and is provided with tapered extremities 61 and 62 forming the material outlet 14. Such slide is adapted to be revolved about the conveyor 11 to adjust the direction in which the material will be discharged from the conveyor 11 upon the conveyor 15, depending upon the position assumed by the latter. The slide 60 is maintained in desired adjusted position by a screw 63 cooperating with appropriate threaded openings 64 in the frame of the conveyor 11.

While I have shown and described certain present preferred embodiments of the invention, I wish it distinctly understood that the same is not limited thereto but may be otherwise embodied within the scope of the following claims.

I claim:

1. Conveying apparatus, comprising conveying means pivotally movable with respect to a receiving station for conveying material in different directions therefrom, driving means operable in the same direction regardless of the direction of the conveying means, and means connected with the conveying means and selectively cooperable with the driving means upon pivotal movement of the conveying means for conveying material away from the receiving station.

2. Conveying apparatus, comprising conveying means having a receiving station and a discharging station, the receiving station being adapted to remain at substantially the same location while the discharging station is mounted to swing to a plurality of locations with respect to the receiving station, driving means operable in the same direction regardless of the location of the discharging station, and means connected with the conveying means and selectively cooperable with the driving means depending upon the relative location of the discharging station for conveying material from the receiving station to the discharging station.

3. Conveying apparatus, comprising conveying means having a receiving station and a discharging station, the receiving station being adapted to remain at substantially the same location while the discharging station is mounted to swing to positions in substantially opposite directions therefrom, driving means operable in the same direction regardless of the direction of the discharging station, and separate means connected with the conveying means, one cooperable with the driving means when the discharging station is in one direction and another when the discharging station is in the opposite direction for conveying material from the receiving station to the discharging station.

4. Conveying apparatus, comprising conveying means swingable about an axis adjacent one end thereof, driving means, means on one side of the conveyor cooperable with the driving means to drive the conveyor when in one position and means on the other side of the conveyor cooperable with the driving means to drive the conveyor when in another position.

5. Conveying apparatus, comprising conveying means swingable about an axis adjacent one end thereof, driving means, and means cooperable therewith and comprising oppositely disposed members which when actuated in the same direction cause motion of the conveying means in opposite directions.

6. Conveying apparatus, comprising conveying means having a driving shaft and two gears for rotating the shaft which when turned in the same direction respectively cause rotation of the shaft in opposite directions, and stationarily mounted means for cooperation with the respective gears to drive the conveyor when it is in different positions with respect thereto.

7. Conveying apparatus, comprising conveying means having driving gears at opposite sides thereof which when turned in the same direction respectively cause operation of the conveyor in opposite directions, a stationarily mounted driving means and means for reversing the position of the conveyor to selectively bring the respective gears into cooperative relation with the driving means.

8. Conveying apparatus, comprising conveying means having a rotatable shaft, a gear keyed thereto, and other conveying means into which the first mentioned is adapted to discharge, such second mentioned conveying means having oppositely disposed driving gears adapted to mesh with and be driven by the gear keyed to the shaft of the first mentioned conveying means, and means for reversing the second mentioned conveying means to permit of such driving engagement.

9. Conveying apparatus, comprising a screw conveyor, a conveyor of the endless type into which the screw conveyor discharges, a gear on the screw conveyor shaft, gears at opposite sides of the endless conveyor adapted respectively to mesh with and be driven by the gear on the screw conveyor shaft for driving the endless conveyor, and means for reversing the endless conveyor to bring its respective gears selectively into cooperative relation with the screw conveyor gear.

10. Conveying apparatus, comprising a screw conveyor, a conveyor of the endless type onto one end of which the screw conveyor is adapted to discharge, a gear on the screw conveyor shaft, a driving shaft at the end of the endless conveyor onto which the screw conveyor discharges, a gear on each side of the endless conveyor for driving such shaft, each of such gears being adapted when on the side of the screw conveyor to mesh with and be driven by the gear on the screw conveyor shaft, and means for pivotally turning the endless conveyor about an axis at the end thereof nearest the screw conveyor, the gears on the endless conveyor being arranged to drive the same away from the screw conveyor regardless of which is in mesh with the gear on the screw conveyor shaft.

11. Conveying apparatus, comprising an endless conveyor, a driving shaft therefor, a gear keyed thereto, and another gear connected to the driving shaft through reversing mechanism whereby rotation of the first mentioned gear forward drives the shaft forward and rotation of the second mentioned gear backward drives the shaft forward.

12. Conveying apparatus, comprising conveying means, a driving shaft therefor, a gear keyed thereto and a second gear connected thereto through reversing mechanism, other conveying means having a shaft, a gear connected thereto, and means for selectively bringing the respective gears on the first mentioned conveying means into mesh with the gear on the second mentioned conveying means.

13. Conveying apparatus, comprising conveying means, a driving shaft therefor, a gear directly connected with the driving shaft, a second gear connected with the driving shaft through reversing mechanism, other conveying means discharging into the first mentioned conveying means, a gear connected with the second mentioned conveying means, means for bringing one of the gears on the first mentioned conveying means into mesh with the gear on the second mentioned conveying means, and means for reversing the position of the first mentioned conveying means to bring the other gear thereon into mesh with the gear on the second mentioned conveying means.

14. Conveying apparatus, comprising conveying means carried adjacent one end on a vertical pivot, a driving shaft therefor, a gear connected with each end of the driving shaft, such gears being on opposite sides of the axis of the pivot, a stationarily mounted driving gear adapted to mesh selectively with each of the two gears first mentioned upon rotation of the conveying means about the pivot, and means for moving the conveying means sufficiently to effect engagement and disengagement of the gear teeth independently of movement thereof about the vertical pivot.

15. Conveying apparatus, comprising pivotally supported conveying means, driving means on opposite sides thereof, a source of power adapted to selectively cooperate with such driving means, the conveying means being movable about its pivot to bring the respective driving means into cooperative relation with the source of power, and means for moving the conveying means sufficiently to effect engagement and disengagement of the respective driving means and the source of power independently of movement thereof about said pivot.

16. Conveying apparatus, comprising pivotally supported conveying means, driving means therefor on opposite sides thereof, a source of power adapted to selectively cooperate with the respective driving means, the conveying means being movable about its pivot to bring the respective driving means into cooperative relation with the source of power, and interengaging means positively maintaining the conveying means and source of power in cooperative relation in either position.

17. Conveying apparatus, comprising pivotally supported conveying means, driving means therefor on opposite sides thereof, a source of power adapted to selectively cooperate with the respective driving means, the conveying means being movable about its pivot to bring the respective driving means into cooperative relation with the source of power, means for effecting relative movement of the conveying means and source of power sufficiently to effect engagement and disengagement of the respective driving means and the source of power independently of movement of the conveying means about said pivot, and interengaging means positively maintaining the conveying means and source of power in cooperative relation in either position.

18. Conveying apparatus, comprising swingable conveying means having driving means on opposite sides thereof, other conveying means adapted to discharge into the first mentioned conveying means and having a source of power for the first mentioned conveying means adapted to selectively cooperatively engage with the respective driving means on the first mentioned conveying means upon swinging movement thereof, and interengaging means positively maintaining the first and second mentioned conveying means in cooperative relation.

19. Conveying apparatus, comprising a driving conveyor, a driven conveyor, driving connections between the conveyors for driving one from the other, the conveyors being relatively movable to assume different operative positions with respect to each other, said connections including reversing mechanism, whereby the direction of motion of the driven conveyor with respect to the driving conveyor is always the same.

In testimony whereof I have hereunto set my hand.

JAMES B. McWILLIAMS.